United States Patent
Scheybal et al.

(10) Patent No.: US 10,889,905 B2
(45) Date of Patent: Jan. 12, 2021

(54) METHODS OF GENERATING MANGANESE (III) IONS IN MIXED AQUEOUS ACID SOLUTIONS USING OZONE

(71) Applicant: Rohm and Haas Electronic Materials LLC, Marlborough, MA (US)

(72) Inventors: Andreas Scheybal, Zurich (CH); Katharina Weitershaus, Kriens (CH); Krishna Balantrapu, Cambridge, MA (US)

(73) Assignee: Rohm and Haas Electronic Materials LLC

(*) Notice: Subject to any disclaimer, the term of this patent is extended or adjusted under 35 U.S.C. 154(b) by 0 days.

(21) Appl. No.: 16/593,397

(22) Filed: Oct. 4, 2019

(65) Prior Publication Data

US 2020/0181787 A1 Jun. 11, 2020

Related U.S. Application Data

(60) Provisional application No. 62/777,892, filed on Dec. 11, 2018.

(51) Int. Cl.
*C25C 1/10* (2006.01)
*C08J 7/14* (2006.01)

(52) U.S. Cl.
CPC .. *C25C 1/10* (2013.01); *C08J 7/14* (2013.01)

(58) Field of Classification Search
CPC ... C25C 1/10; C08J 7/14; C09K 13/06; C23C 18/285; C23C 18/30; C23C 18/32; C23C 18/208; C23C 18/24
See application file for complete search history.

(56) References Cited

U.S. PATENT DOCUMENTS

| | | | |
|---|---|---|---|
| 8,603,352 B1 | 12/2013 | Zhang-Beglinger et al. | |
| 9,267,077 B2 | 2/2016 | Weistershaus et al. | |
| 2013/0186862 A1* | 7/2013 | Pearson | C09K 13/04 216/83 |
| 2014/0306147 A1* | 10/2014 | Weitershaus | C09K 13/06 252/79.4 |

OTHER PUBLICATIONS

Search report for corresponding Taiwan Application No. 108144704 dated Jul. 8, 2020.
Search report for corresponding European Application No. 19 21 5053 dated Apr. 2, 2020.

* cited by examiner

*Primary Examiner* — Duy Vu N Deo
(74) *Attorney, Agent, or Firm* — John J. Piskorski

(57) ABSTRACT

Manganese-(III) species is generated and regenerated in a mixed aqueous acid solution containing manganese-(II) species by injecting ozone gas in the mixed aqueous acid solution such that ozone oxidizes at least some of the manganese-(II) species to the manganese-(III) species with at least 60% Mn(III) generation efficiency. The acids include sulfuric acid and an alkane sulfonic acid. The aqueous acid solution containing manganese-(III) and manganese-(II) species is used to etch polymer materials. The etch is a chrome-free etch method.

8 Claims, 5 Drawing Sheets

METHODS OF GENERATING MANGANESE (III) IONS IN MIXED AQUEOUS ACID SOLUTIONS USING OZONE

FIELD OF THE INVENTION

The present invention is directed to methods of generating manganese-(III) ions in mixed aqueous acid solutions using ozone. More specifically, the present invention is directed to methods of generating manganese-(III) ions from manganese-(II) ions in mixed aqueous acid solutions of sulfuric acid and alkane sulfonic acids using ozone, wherein efficiency of generation of the manganese-(III) ions from the manganese-(II) ions with the ozone is at least 60%.

BACKGROUND OF THE INVENTION

Prior to metallization a substrate surface containing organic polymers is typically etched to achieve good adhesion between the substrate surface and plated metals. Although great efforts have been made over the years by many chemical suppliers and the plating industry to replace currently used toxic etching solutions, no commercial product which is free of hexavalent chromium or Cr(VI) is currently available on the market to provide the efficiency desired by the metallization industry.

Cr(VI) containing compounds are suspected of being cancer-causing. Accordingly, dealing with these compounds is subject to strict environmental regulations. In the face of the potential danger caused by Cr(VI) releasing compounds, a prohibition of the industrial use of Cr(VI) containing compounds cannot be excluded.

Over the years a variety of chemical species have been suggested by the industry for use as chrome-free oxidizing agents in wet etching processes to modify organic polymer surfaces. Such oxidants include Mn(VII), Mn(VI), Mn(IV), Ce(IV), persulfate, $H_2O_2$, organic solvents such as dioxane, metal halogenides and nitrates of Fe, Cu, Ti, Zn, and Mg. Oxidizing agents are consumed either by the etching process or due to the instability of the oxidants. Therefore, frequent replenishing or a regeneration method is needed. Regeneration methods are especially preferred for industrial settings. Mn(VII) is one of the most commonly used oxidizing agents. In aqueous solution, it is typically in the form of ionic species $MnO_4^-$. Electrochemical regeneration of Mn(VII) in alkaline solutions has been used in different industries, such as in the manufacture of circuit boards. In acidic media, regeneration of Mn(VII) appears more difficult than in an alkaline medium. Published literature using catalysts such as Ag(I) or Bi(III) for electrochemical oxidation is sparse. The studies of Fleischmann et al. (J. Appl. Electrochem. Vol. 1, pp. 1, 1971) have shown that Ag(I) is a good catalyst for oxidizing both organic and inorganic species electrochemically. Park et al. (J. Electrochem. Soc. Vol. 151, pp. E265, 2004) disclose that Bi(III) on a boron-doped diamond (BDD) electrode also may act as electron transfer mediator to oxidize Mn(II) to Mn(VII). Boardman (J. Electroanal. Chem. Vol. 149, pp. 49, 1983) and Comninellis (Electrochimica Acta, Vol. 36, No. 8, pp. 1363, 1991) have demonstrated the possibility of electrochemical formation of Mn(VII) from Mn(II) in a sulfuric acid medium in the presence of Ag(I) and the experimental conditions to increase the current efficiency of Mn(VII) formation. U.S. 2011/0140035 discloses similar methods for use in a permanganate acidic pickling solution for pre-treatment of plastic surfaces.

However, either in an acidic or alkaline medium, Mn(VII) is unstable and tends to reduce to its lower oxidation states, especially to Mn(IV), consequently forming a large quantity of the insoluble $MnO_2$ and causing quality issues on the treated polymer surfaces. Frequent removal of $MnO_2$ precipitation from the permanganate etching solution is therefore required in the industrial scale operation.

An alternative etching species to Mn(VII) is Mn(III). One advantage of Mn(III) based etching solutions is the absence of $MnO_2$ precipitation. Mn(III) based chrome-free etch solutions for pickling polymers for metal plating require continuous regeneration of the Mn(III) consumed in the etching of the polymer surface. Conventionally, the (re)-oxidation of the Mn(III) from its reduced state Mn(II) is done via electrolysis. The electrolytic regeneration can be done with anodes of vitreous carbon, reticulated vitreous carbon or woven carbon fibers in a low current density range of 0.1-0.4 $A/dm^2$ or with platinum, platinized titanium or platinized niobium anodes at high current densities of up to 8 $A/dm^2$. Operating in the low current density range has the disadvantage that this requires very high anode surfaces and the required space for those electrolysis tank equipment becomes inconvenient for industrial scale applications. For example, a plating line capable of plating 1000 $m^2$ polymer material in 24 hours requires at least 1.6 $m^2$ anode surface to operate at a current density of 0.25 $A/dm^2$.

With platinum anodes, the current efficiency at higher current densities is only in the range of 30-50%. Also, due to the lower current efficiency, oxygen is evolved at the anode which decreases the anode life-time because of the corrosion of platinum. For example, a plating line capable of plating 1000 $m^2$ plastic in 24 hours requires only 0.23 $m^2$ of platinized anode surface at 5 $A/dm^2$ anodic current density. However, the anode life time for a platinum thickness of 10 μm is expected to be approximately one year due to platinum corrosion of ca. 200 $g/m^2$/year at this current density (according to Génie Electroch.; Edit: H Went and G. Kreysa, Dunod-Paris; p. 307 (2001)).

In addition, in the electrolytic regeneration of Mn(III), hydrogen gas is produced in stoichiometric amounts at the cathode and needs to be diluted with sufficient amount of air to be out of the explosive range (below 4% $H_2$ in air). Due to the above reasons, the electrolytic regeneration process has the disadvantage of being inefficient, expensive and potentially hazardous, with the electrolysis tank consuming considerable factory space.

Therefore, there is a need for a chrome-free etch method using Mn(III) ions as an etch species which is efficient for generating the etch species during continuous operation and is unhazardous and environmentally friendly.

SUMMARY OF THE INVENTION

The method of the present invention includes providing a substrate comprising one or more organic polymers; providing an aqueous acid solution comprising sulfuric acid, one or more alkane sulfonic acids and Mn(II) ions and counter anions; injecting ozone gas in the aqueous acid solution to oxidize the Mn(II) ions with ozone to generate at least 15 mmol/L Mn(III) ions, wherein efficiency of oxidizing Mn(II) ions with the ozone to generate the at least 15 mmol/L Mn(III) ions is at least 60%; and contacting the substrate comprising the one or more organic polymers with an aqueous acid solution containing the at least 15 mmol/L Mn(III) ions to etch the one or more polymers of the substrate.

The methods of the present invention using ozone as an oxidizing agent to oxidize Mn(II) ions to Mn(III) ions enable a high efficiency process for generating and regenerating the Mn(III) ion etch species. The methods of the present invention eliminate the need for electrodes and electrolysis to generate and regenerate the Mn(III) ion species and the inefficiencies of the electrolysis process. The method of generating Mn(III) using ozone of the present invention generates environmentally friendly waste products such as water and oxygen. The rapid oxidation of Mn(II) to Mn(III) using ozone also reduces or eliminates any undesirable side reactions which can compromise the efficiency of oxidizing Mn(II) to Mn(III).

The methods of the present invention etch the one or more polymers of substrates prior to metallization using chrome-free aqueous acid solutions, thus eliminating a hazardous and environmentally undesirable compound. The methods use dissolved Mn(III) ions as etching agents in place of Cr(VI) to roughen the one or more polymers. Mn(III) ions are more stable in the aqueous acid solution than Mn(VII) ionic species, do not readily form insoluble $MnO_2$ as does Mn(VII). Mn(III) ions are generated and regenerated in the aqueous acid solution by oxidizing Mn(II) ions with ozone. The methods of the present invention can be continuous processes where the Mn(III) ions are generated from Mn(II) ions with ozone and Mn(III) ions which are reduced back to Mn(II) ions during the etch process are oxidized or regenerated to Mn(III) ions by ozone.

The mixture of the sulfuric acid and the one or more organic acids increases the solubility of the Mn(II) and Mn(III) ions such that the Mn(II) and Mn(III) ions are substantially completely dissolved in the aqueous acid solution to provide concentrations of at least 15 mmol/L of the Mn(III) oxidizing agent in the solution and to operate using standard solution circulation and filtration systems under production conditions. Furthermore, it is known that solutions with higher sulfuric acid content readily adsorb water from the atmosphere due to the hygroscopicity of sulfuric acid. By replacing part of the sulfuric acid with one or more organic acids, water adsorption can be reduced or prevented thus maintaining good etching performance.

In addition, metals plated on the etched polymers of the present invention have good peel strength. Such peel strengths range from 7 N/cm and greater, or such as 10 N/cm and greater.

DETAILED DESCRIPTION OF THE INVENTION

Figure 1:
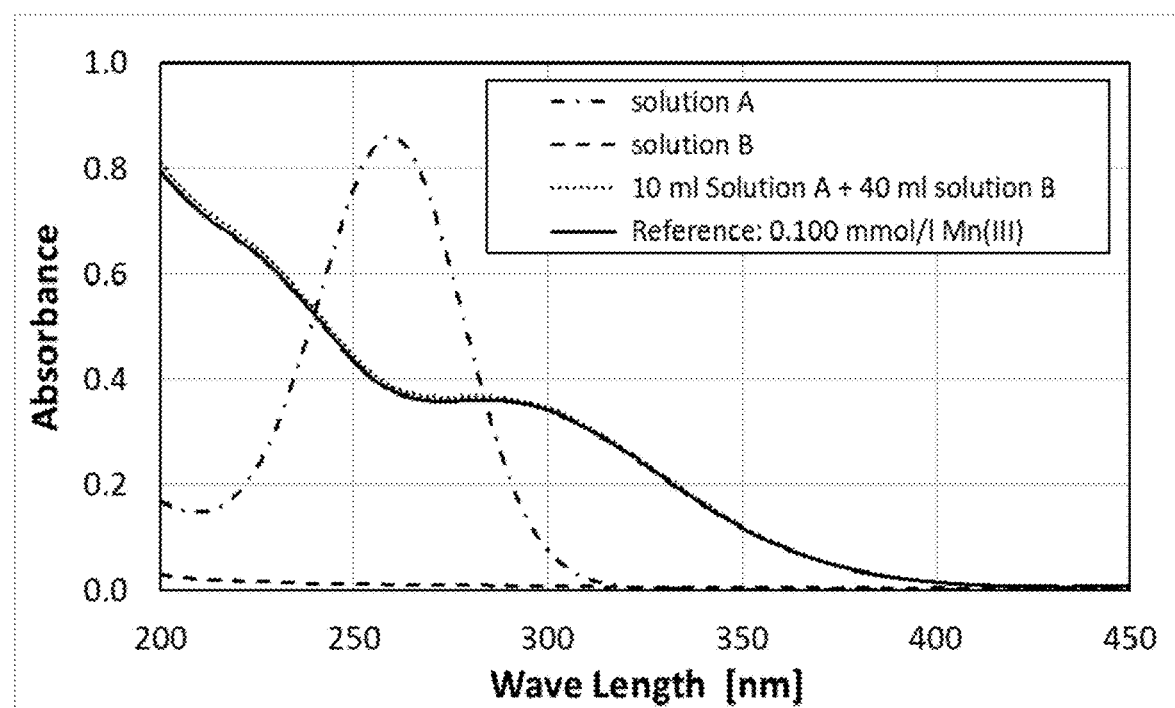
FIG. 1 is UV spectra of absorbance vs. wavelength (nm) measured with a 1 cm cuvette of an ozonated mixed acid solution (solution A) containing 7.2 mol/L sulfuric acid and 5.4 mol/L methanesulfonic acid, of a Mn(II) containing mixed acid solution (solution B) of 25 mmol/L Mn(II) in 7.2 mol/L sulfuric acid and 5.4 mol/L methanesulfonic acid, and of a solution after adding 10 mL of solution A to 40 mL of solution B, and a reference spectrum of 0.100 mmol/L Mn(III).

As used throughout this specification, the abbreviations given below have the following meanings, unless the context clearly indicates otherwise: ° C.=degrees Centigrade; g=gram; L=liter; M=molar or moles per liter; mM=millimolar or millimoles per liter; mol=moles; mmol=millimoles; mL=milliliters; g/L=grams per liter; m=meters; UV=ultra-violet; VIS=visible; nm=nanometers; μm=microns; cm=centimeter; mm=millimeters; min=minute; wt %=percent by weight; N=Newtons; kg=kilogram; Mn=elemental manganese; Mn(II)=manganese two oxidation state; Mn(III)=manganese three oxidation state; Mn(VII)=manganese seven oxidation state; Mn(VI)=manganese six oxidation state; Mn(IV)=manganese four oxidation state; Cr(VI)=chromium six oxidation state; $O_3$=ozone (molecular weight of 48 g/mol); Ag=silver; Bi=bismuth; Ce=cerium; Pb=lead; $H_2SO_4$=sulfuric acid; $MnO_4^-$=permanganate; $KMnO_4$=potassium permanganate; MSA=methanesulfonic acid; ABS=a block copolymer of acrylonitrile, butadiene and styrene); PC-ABS=blend of polycarbonate and a block copolymer of acrylonitrile, butadiene and styrene); PTFE=polytetrafluoroethylene; Absorbance=$-\log_{10}=(I/I_0)$; I=$W/m^2$=transmitted spectral radiant power; $I_0$=$W/m^2$=incident spectral radiant power; SEM=scanning electron microscope; and ASTM=American Standard Testing Method.

The term "generate" means to oxidize Mn(II) ions to Mn(III) ions. The term "regenerate" means to oxidize Mn(II) ions back to Mn(III) where Mn(III) ions in an aqueous acid solution have been reduced to Mn(II) ions. All numerical ranges are inclusive and combinable in any order, except where it is logical that such numerical ranges are construed to add up to 100%. All amounts are percent by weight and all ratios are by weight, unless otherwise noted. The terms "a" and "an" are understood to include both the singular and the plural.

Etch solutions comprise (preferably consist of) Mn(II) ions, counter anions of the Mn(II) ions, and at least 15 mmol/L Mn(III) ions, sulfuric acid and one or more alkane sulfonic acids, wherein the Mn(II) ions are oxidized to Mn(III) by ozone. Preferably, the Mn(III) ions are at a concentration range of 30-60 mmol/L, more preferably from 35-55 mmol/L.

The oxidation of the Mn(II) ions by ozone to generate or regenerate Mn(III) ions occurs in a separate compartment (first compartment) from the etching compartment (second compartment) such that none of the ozone used to oxidize Mn(II) ions to Mn(III) ions interacts with the substrate to be etched during the etch process. The generation or regeneration of Mn(III) ions can be done by batch, or by continuous mode where the compartment for Mn(II) oxidation (first compartment) by ozone is in fluid communication with the compartment where etching of the substrate is done (second compartment). The continuous mode is the preferred mode of operation. Conventional apparatus can be used for batch and continuous mode operations.

The active etching agent for etching and roughening one or more polymers is the dissolved Mn(III) ions. The aqueous acid solutions are not suspensions, dispersions or colloidal solutions. All the solutes of the aqueous acid solutions are substantially dissolved in the aqueous acid solution. The aqueous acid solutions are chromium-free. Sufficient water is added to bring the solution to 100 wt %. The amount of water added may be 15-40 wt % of the solution, preferably, 18-30 wt %, most preferably 19-25 wt %. If the concentration of the water is too high, the etching performance of the solution and the stability of the Mn(III) ions in solution is compromised.

The concentration of the Mn(III) ions is maintained in amounts of at least 15 mmol/L to etch or roughen a polymer substrate by injecting ozone gas in the aqueous acid solution to oxidize Mn(II) ions such that the Mn(III) generation and regeneration efficiency by the ozone are at least 60%, preferably, at least 70%, more preferably, from 80% to 95%. Mn(III) generation and regeneration efficiency is defined as the conversion efficiency by ozone to Mn(III) according to the following equation:

$$\text{Mn(III) (re)generation efficiency} = (\text{amount of Mn(III) (re)generated})/(\text{amount of ozone brought in contact with the solution} \times 2) \times 100\%. \quad (\text{Eq. 1})$$

Ozone as a gas can be produced using conventional ozone generators which are available in a great capacity range for industrial applications of up to 750 g of Ozone per hour and more. The generation of ozone can be done from either air or pure oxygen, with the latter ozone concentrations of up to 16 wt % can be reached. When ozone gas mixture is injected in the etch solution the following sequence of reactions occur and dominate:

$$O_3 \text{ (gas)} \rightarrow O_3 \text{ (dissolved)} \quad (1)$$

$$O_3 \text{ (dissolved)} + 2Mn^{2+} + 2H^+ \rightarrow 2Mn^{3+} + H_2O + O_2 \quad (2)$$

The rate determining step of the overall reaction is the transfer of ozone from the gas to the liquid phase (reaction 1). Ozone dissolved in the liquid phase reacts with the Mn(II) ions to form Mn(III) in 5 seconds or less. Therefore, to achieve high Mn(III) generation and regeneration efficiency a gas-liquid interface is maximized and retention time of gas bubbles in the liquid phase is extended. The gas liquid interface is maximized by bringing the ozone gas in contact with the liquid in form of very small gas bubbles which can be achieved by either injecting the ozone through a microporous diffuser or via a venturi injector. Such devices are well known in the art and can be obtained from various suppliers, e.g. Lenntech BV, Holland. The retention time of the gas bubbles can be increased in the case of regeneration in batch mode by increasing the length of the liquid column the gas bubbles travel or by decreasing the gas bubble diameter which decreases their ascension velocity. The retention time of the gas bubbles can be additionally increased by stirring the solution. In the case of regeneration in continuous mode, the retention time can be adjusted by the design of the reactor (i.e. the compartment for Mn(II) oxidation). For example, in the case of a plug flow reactor with co-current flow of the liquid and the gas bubbles, the retention time of the gas bubbles is the ratio between length of the reaction tube (cm) and the linear flow rate (cm/min) of the gas-liquid mixture. The linear flow rate is the ratio between the volumetric flow rate (mL/min) and the cross-sectional area (cm²) of the reaction tube. Thus, the retention time can be increased by decreasing the linear flow rate by either decreasing the volumetric flow rate or by increasing the cross-sectional area of the tube. The retention time required to achieve high Mn(III) regeneration efficiencies (i.e. above 60%) depends on the size of the gas bubbles. The smaller the gas bubbles, the larger will be the gas liquid interface, and thus the faster will be the transfer of the ozone from the gas into the liquid. For example, when ozone is injected via a PTFE frit with 3 μm pore size, the diameter of the gas bubbles can be ca. 0.5-1.0 mm. With such gas bubble diameters a Mn(III) regeneration efficiency of 78% can be obtained at 6 seconds retention time of the gas bubbles (e.g. Example 2).

The ozone can initiate oxidation of Mn(II) ions to Mn(III) ions in an aqueous acid solution initially free of Mn(III) ions, or the ozone can generate Mn(III) from Mn(II) in an aqueous acid solution containing both species. Also, if any Mn(III) is reduced back to Mn(II) in the aqueous acid etch solution, the ozone can regenerate the Mn(III) ion species. The ozone method of the present invention can be a continuous process of generating and regenerating the Mn(III) ion species during the etch process. As the one or more polymers of the substrate are being etched in the aqueous acid etch solution in one compartment, ozone gas is continuously brought in contact with an aqueous acid solution in a separate compartment to oxidize some of the Mn(II) ions to generate Mn(III) ions or, where any Mn(III) ion species is reduced back to Mn(II), regenerate Mn(III) ions.

The reactions which occur result in environmentally friendly waste products of water and oxygen in solution as well as generation of oxygen gas to the environment. The rapid rate at which reaction (2) occurs significantly reduces unwanted side-reactions of, for example, (1a) and (2a):

$$2O_3 \text{ (dissolved)} \rightarrow 3O_2 \text{ (self-decomposition)} \quad (1a)$$

$$4O_3 \text{ (dissolved)} + RSO_3H \rightarrow H_2SO_4 + CO_2 + H_2O + 4O_2 \quad (2a)$$

wherein R is an unsubstituted, linear or branched ($C_1$-$C_5$) alkyl. Such undesired side reactions can compromise the efficiency of the methods of the present invention.

Ozone is injected in the aqueous acid solution at a rate of at least 0.05 g/L/hour, preferably, 0.10 g/L/hour to 10 g/L/hour, more preferably, from 0.20 g/L/hour to 7 g/L/hour.

Concentrations of Mn(III) ions in solution can be readily determined by UV/VIS spectroscopy at the wavelength range from 530 nm to 520 nm. The Mn(II) ion concentration in solution is then determined by the difference between the total Mn concentration in solution determined by atomic absorption spectroscopy (AAS) and the Mn(III) ion concentration in solution. UV/VIS and AAS are well known in the art and commonly used analytical methods for the analysis of metal concentrations in solutions. Mn(III) ions are at concentrations of 15 mmol/L or greater, preferably, from 15-70 mmol/L, more preferably, from 30-60 mmol/L and even more preferably, from 35-55 mmol/L.

Sources of Mn(II) ions include, but are not limited to Mn(II)-sulfate, Mn(II)-phosphate, Mn(II)-hydrogen phosphate, Mn(II)-hypophosphate, Mn(II)-carbonate, Mn(II)-oxide, Mn(II)-hydroxide, Mn(II)-halogenide, Mn(II)-nitrate, Mn(II)-acetate, Mn(II)-lactate, Mn(II)-oxalate, Mn(II)-citrate, Mn(II)-acetylacetonate, Mn(II)-sulfide, Mn(II)-formate, Mn(II)-ethylenediamine tetraacetate-complexes (EDTA), Mn(II)-nitrilo triacetic acid (NTA) complexes, manganese(II) species with nitrogen-chelates such as porphines such as 5,10,15,20-tetraphenyl-21H,23H-porphine and 2,3,7,8,12,13,17,18-octaethyl-21H-23H-porphine and phthalocyanines. Such manganese compounds are known in the art and are known in the literature and some are commercially available. They are included in the solutions in sufficient amounts to provide a Mn(II) ion concentration of at least 5 mmol/L up to saturation concentration in the aqueous acid solutions, preferably, from 10-100 mmol/L, more preferably from 15-65 mmol/L.

Sulfuric acid is included in the aqueous acid solutions in amounts of 1 wt % to 84 wt %, preferably from 15 wt % to 70 wt %. Alkane sulfonic acids include methane sulfonic acid, ethane sulfonic acid and propane sulfonic acid. Preferably, the organic acids are ethane sulfonic acid and methane sulfonic acid. Most preferably, the alkane sulfonic acid is methane sulfonic acid. Alkane sulfonic acids are included in the aqueous acid solutions in amounts of 1 wt % to 84 wt %, preferably, 15 wt % to 70 wt %. Preferably the concentration ratio of the organic acid to sulfuric acid (wt/wt) is greater than 0.20, more preferably greater than 0.40, most preferably greater than 0.60 the minimize the hygroscopicity of the etching solution.

Optionally, one or more catalysts can be added to the etch solution to accelerate the regeneration process and increase the etching activity of Mn(III) ions. Such catalysts include, but are not limited to, metal ions chosen from Ag(I), Bi(III), Bi(V), Ce(IV) and Pb(II) ions. Such metal ions can be included in the etch solutions in amounts of 25-1000 mg/L metal, preferably, in amounts of 100-500 mg/L metal. Sources of such catalysts are known in the art and literature and many are commercially available such as silver(I) nitrate, silver(I) sulfate, silver(I) oxide, silver(I) methane sulfonate, silver(I) carbonate, bismuth(III) methane sulfonate, bismuth(III) oxide, bismuth(III) nitrate, bismuth(III) carbonate, bismuth(V) oxide, sodium bismuthate(V), lead(II) acetate or cerium(IV) ammonium nitrate.

The substrate with the one or more organic polymers is immersed in the aqueous acid solution or the solution is sprayed on the substrate. Etching of the organic polymer is done at solution temperatures of 10° C. to 135° C., preferably from 20° C. to 100° C., more preferably from 30° C. to 80° C.

Organic polymers include, but are not limited to thermosetting resins, thermoplastic resins, and combinations thereof. Thermoplastic resins include, but are not limited to, acetal resins, acrylics, such as methyl acrylate, cellulosic resins, such as ethyl acetate, cellulose propionate, cellulose acetate butyrate and cellulose nitrate, polyethers, nylon, polyethylene, polypropylene, polystyrene, styrene blends, such as acrylonitrile styrene and copolymers and acrylonitrile-butadiene styrene (ABS) copolymers, polycarbonates (PC), polychlorotrifluoroethylene, and vinylpolymers and copolymers, such as vinyl acetate, vinyl alcohol, vinyl butyral, vinyl chloride, vinyl chloride-acetate copolymer, vinylidene chloride and vinyl formal.

Thermosetting resins include, but are not limited to, allyl phthalate, furane, melamine-formaldehyde, phenol-formaldehyde and phenol-furfural copolymers, alone or compounded with butadiene acrylonitrile copolymers or acrylonitrile-butadiene-styrene (ABS) copolymers, polyacrylic esters, silicones, urea formaldehydes, epoxy resins, allyl resins, glyceryl phthalates and polyesters.

Other classes of polymer resins include, but are not limited to, epoxy resins, such as difunctional and multifunctional epoxy resins, bimaleimide/triazine and epoxy resins (BT epoxy), epoxy/polyphenylene oxide resins, acrylonitrile butadienestyrene (ABS), polycarbonates (PC), polyphenylene oxides (PPO), polypheneylene ethers (PPE), polyphenylene sulfides (PPS), polysulfones (PSU), polyamides (PA), polyesters such as polyethyleneterephthalate (PET) and polybutyleneterephthalate (PBT), polyetherketones (PEEK), liquid crystal polymers (LCP), polyurethanes (PU), polyetherimides (PEI), epoxies and composites thereof.

Optionally, prior to etching with the aqueous acid solution and method of the present invention, the polymers of the substrate can be cleaned and solvent swelled using conventional process steps. An example of a commercially available cleaner is Cleaner PM-900 and for solvent sweller is Conditioner PM-920. The substrate with the organic polymer is treated with the aqueous acid etch solution for 10 seconds to 30 minutes, preferably 2 minutes to 15 minutes. After the organic polymers of the substrate are etched the substrate is rinsed with water and then further processed using conventional methods in preparation for metallization. Such steps in preparation for metallization can include treating the polymers of the substrate with an activator for electroless metallization, such as a palladium-tin colloidal catalyst. An example of a commercially available palladium-tin colloidal catalyst is CATAPOSIT™ PM-957 colloidal palladium-tin catalyst. Optionally, the polymers of the substrate can be treated with an accelerator, such as ACCELERATOR™ PM-964 solution. It is then metalized using conventional metal plating processes and metal plating baths, such as nickel and copper. An example of a commercially available nickel bath is NIPOSIT™ PM-988 electroless nickel plating solution. An example of a commercially available copper plating bath is ECOPOSIT™ 950 copper electroplating bath. All the foregoing commercial products are available from Rohm and Haas Electronic Materials LLC, Marlborough, Mass.

The following examples are included to further illustrate the invention but are not intended to limit its scope.

Example 1

An ozone containing mixed acid solution (solution A) was prepared by passing ozone through a solution of 400 mL/L sulfuric acid 96 wt % (7.2 M sulfuric acid) and 550 mL/L methanesulfonic acid 70 wt % (5.4 M methanesulfonic acid). The ozone was produced with an OZONETECH ICT-10™ ozone generator (available from Ozone Tech Systems OTS AB) at an ozone production rate of 4.99 g/hour (5.87 g/L/hour) of ozone gas from pure oxygen. The ozone/oxygen gas mixture (11.2 wt % of ozone) was passed at a rate of 0.5 L/min for 10 min (0.83 g $O_3$) through 0.85 L solution of the mixed acid solution. The pH of the aqueous acid solution was less than 1. The ozone was brought in contact with the aqueous acid solution via a PTFE gas distributer with 4 holes of 0.5 mm diameter in a 1 liter glass bottle such that the travel length of the ozone gas through the solution was 10 cm. After the ozone was passed through this solution, the concentration of ozone dissolved in the solution was determined via UV absorbance at 259 nm. The ozone concentration of the ozonated mixed acid solution was 0.296 mmol/L (14.21 mg/L).

A mixed acid Mn(II) solution (solution B) containing 400 mL/L sulfuric acid 96 wt % (7.2 M sulfuric acid), 550 mL/L methanesulfonic acid 70 wt % (5.4 M methanesulfonic acid), 73 mL/L water, 4.22 g/L manganese(II)sulfate monohydrate (25.0 mmol/L) was prepared.

10 mL of the ozone containing mixed acid solution A was added under fast agitation to 40 mL of the mixed acid Mn(II) solution B. Immediately (within less than 5 seconds) after mixing of the two solutions a slight violet color from Mn(III) produced by the reaction of the ozone with Mn(II) appeared. The UV spectrum of the solution after the reaction matched with a reference spectrum of Mn(III) (FIG. 1). The UV absorbance peak of ozone at 259 nm was completely absent in the solution after the reaction showing that all the ozone had reacted and no aqueous ozone was no longer present.

From the absorbance at 282 nm a Mn(III) concentration of 0.0999 mmol/L was determined. The Mn(III) formation efficiency (yield with respect to amount of ozone) of the reaction of aqueous ozone with Mn(II) by mixing the two solutions was thus:

Efficiency=0.0999 mmol/L×50 mL/(0.296 mmol/L× 10 mL×2)=84.4%.

This example showed that aqueous ozone reacted very fast with Mn(II) in the mixed acid solution to form Mn(III) at efficiencies above 80%. Thus, when ozone gas was brought into contact with a Mn(II) containing mixed acid solution of sulfuric acid and methanesulfonic acid, the ozone reacted with the Mn(II) to form Mn(III) at a gas/liquid interface such that there was no ozone present in the bulk of the solution.

Example 2

A OZONETECH ICT-10™ ozone generator (available from Ozone Tech Systems OTS AB) was used to generate 5.22 g/hour (4.35 g/L/hour) of ozone gas from pure oxygen. The ozone/oxygen gas mixture (11.7 wt % ozone) was passed at 0.5 L/min. for 18 min (1.57 g $O_3$) through 1.2 L solution of 400 mL/L sulfuric acid 96 wt % (7.2 M sulfuric acid), 550 mL/L methanesulfonic acid 70 wt % (5.4 M methanesulfonic acid), 73 mL/L water, 11 g/L manganese (II) sulfate monohydrate (65.1 mmol/L) and 470 mg/L silver methanesulfonate (2.31 mmol/L) at 60° C. The pH of the aqueous acid etch solution was less than 1. The ozone was brought in contact with the aqueous acid etch solution via a PTFE frit with 3 μm pore size in a vertical tube of 4.3 cm inner diameter such that the travel length of the ozone gas through the solution was 75 cm. The time that the gas bubble required for traveling the 75 cm of solution was about 6 seconds.

During ozone injection in the aqueous acid etch solution, the color changed from slightly yellowish to purple which indicated formation of Mn(III) ions as confirmed by the UV/VIS spectrum of the solution (recorded with a HITACHI U-2910 spectrophotometer) showing an absorbance maximum at 525 nm. The following equations illustrate the reaction which occurred:
1) Dissolving ozone: $O_3$ (gas)→$O_3$ (dissolved in aqueous acid solution).
2) The dissolved ozone reacts in the aqueous acid solution with Mn(II) ions within 5 seconds or less as shown by the chemical equation below.

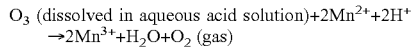

The concentration of Mn(III) went from 0 to 2.34 g/L (42.6 mmol/L) which corresponds to a Mn(III) generation efficiency of 78.3% (calculated according to equation 1). When the Mn(III) reached the concentration of 42.6 mmol/L as measured by UV/VIS absorbance at 525 nm, the ozone injection was stopped. The concentration of unreacted Mn(II) as manganese(II)sulfate monohydrate at the time the ozone injection was stopped was 1.23 g/L.

Amount of etching species generated=42.6 mmol/L× 1.2 L=51.12 mmol

Amount of ozone brought into contact with the aqueous acid solution=5.22 g/hour×18 min/48 g/mol=32.63 mmol (48 g/mol=molar mass of ozone)

Ozone conversion efficiency=(51.12 mmol)/32.63 mmol×2)×100%=78.3%.

Example 3 (Comparative)

A OZONETECH ICT-10™ ozone generator (available from Ozone Tech Systems OTS AB) was used to generate 6.75 g/hour (4.21 g/L/hour) of ozone gas from pure oxygen. The ozone/oxygen gas mixture (12.7 wt % of ozone) was passed at 0.6 L/min for 15 min (1.68 g $O_3$) through 1.6 L solution of 400 mL/L sulfuric acid 96 wt % (7.2 M sulfuric acid), 550 mL/L methanesulfonic acid 70 wt % (5.4 M methanesulfonic acid), 73 mL/L water, 11 g/L manganese (II)sulfate monohydrate (65.1 mmol/L) and 470 mg/L silver methanesulfonate (2.31 mmol/L) at 60° C. The pH of the aqueous acid etch solution was less than 1. The ozone was brought in contact with the aqueous acid etch solution via a PTFE frit with 3 μm pore size in a 2 L gas wash bottle such that the travel length of the ozone gas through the solution was 12 cm. The time that the gas bubbles required for traveling the 12 cm of solution was about 1 second. During ozone injection in the aqueous acid etch solution, the color changed from slightly yellowish to purple which indicated formation of Mn(III) ions as confirmed by the UV/VIS spectrum of the solution (recorded with a HITACHI U-2910 spectrophotometer) showing an absorbance maximum at 525 nm.

The concentration of Mn(III) went from 0 to 0.747 g/L (13.6 mmol/L) which corresponds to Mn(III) generation efficiency of 30.9% (calculated according equation 1). The concentration of unreacted Mn(II) as manganese(II)sulfate monohydrate at the time the ozone injection was stopped was 2.82 g/L.

Amount of etching species generated=13.6 mmol/L× 1.6 L=21.76 mmol

Amount of ozone brought into contact with the aqueous acid solution=6.75 g/hour×15 min/48 g/mol=35.16 mmol (48 g/mol=molar mass of ozone)

Mn(III) generation efficiency=(21.76 mmol)/(35.16 mmol×2)×100%=30.9%.

Example 4 (Comparative)

Figure 2:
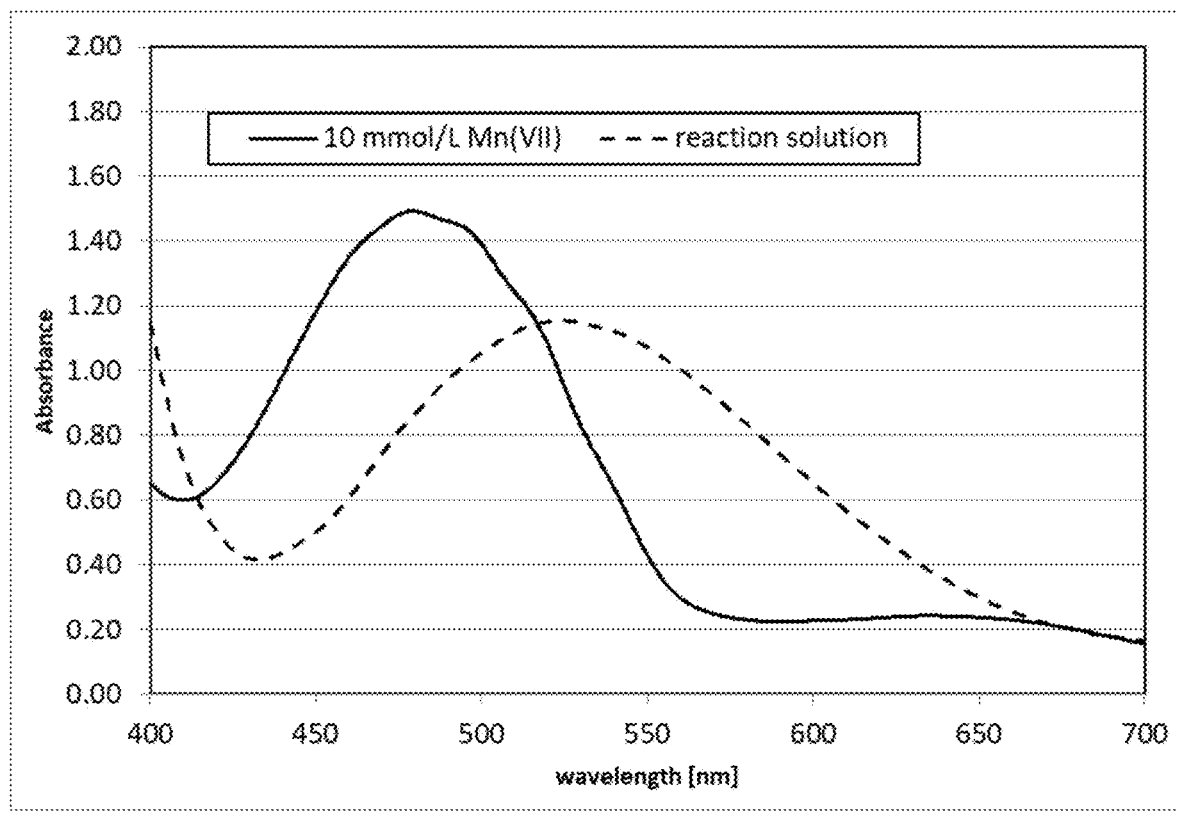
FIG. 2 is UV/VIS spectra of absorbance vs. wavelength (nm) of ozone injection in an aqueous acid reaction solution containing Mn(III) after 18 minutes vs. an aqueous acid solution containing Mn(VII) ions.

During Ozone injection as described in Example 2, Mn(III) was the highest oxidation species in the aqueous acid solution as demonstrated by UV/VIS spectroscopy and shown in FIG. 2. The dashed line in FIG. 1 shows the UV/VIS spectrum of the aqueous acid solution after 18 min of ozone injection between 400 and 700 nm using a 2 mm cuvette, while the solid line UV/VIS spectrum shows Mn(VII) species derived from dissolving 10 mmol/L potassium permanganate in the acid matrix having the concentrations as disclosed in Example 2. The two species were distinguished by their different absorbance maxima in the visible region (525 nm: Mn(III), 480 nm Mn(VII)).

Figure 3:
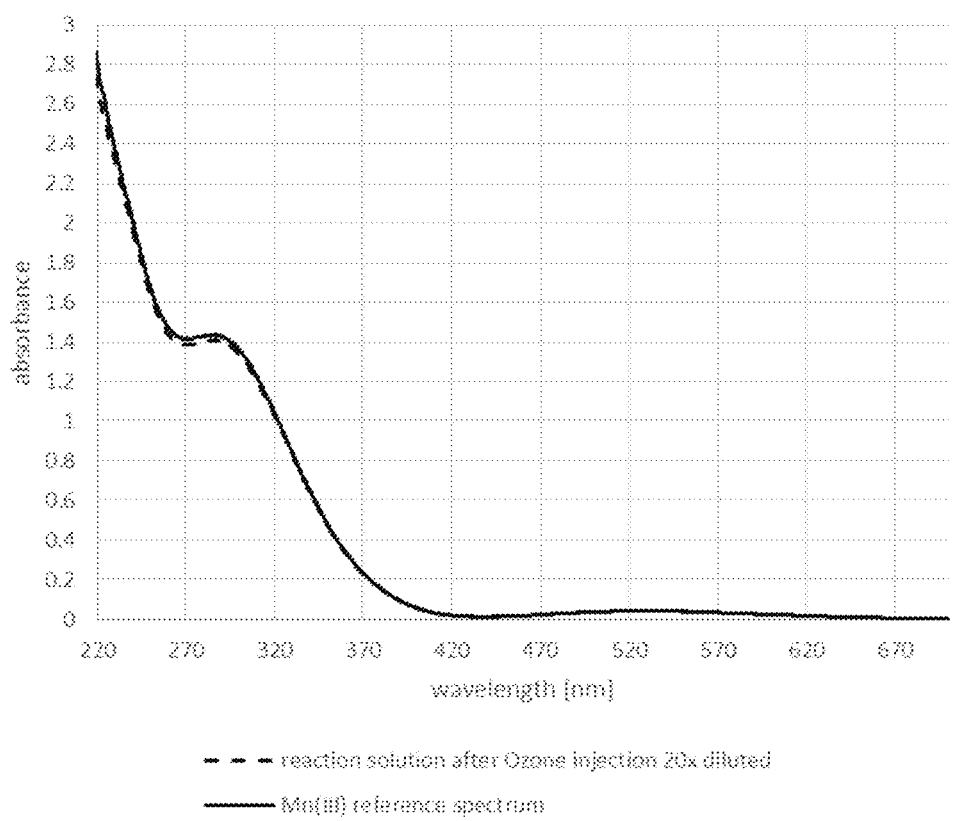
FIG. 3 is UV/VIS spectra of absorbance vs. wavelength (nm) of an aqueous acid solution containing Mn(III) regenerated with ozone and a reference spectrum of Mn(III) prepared by dissolving commercially available Mn(III) acetate in an aqueous acid solution.

FIG. 3 shows a comparison of the UV/VIS spectra of the aqueous acid solution of Example 2 diluted 20× (for better resolution of the peaks also in the UV area) with a reference spectrum of Mn(III) prepared by dissolving commercially available Mn(III) acetate (obtained from Sigma-Aldrich) in the acid matrix. Each sample was placed in a 2 mm cuvette. The UV/VIS spectrum of the aqueous acid solution in Example 2 is shown by the dashed line. The solid line is the UV/VIS spectrum of the commercially available Mn(III) acetate dissolved in the acid matrix of Example 2. Both spectra substantially match over the entire spectral range from 220 nm to 700 nm. The matching of the spectra showed that there is no Mn(VII) formed in the aqueous acid etch solution generated with ozone oxidation.

Example 5

Figure 4:
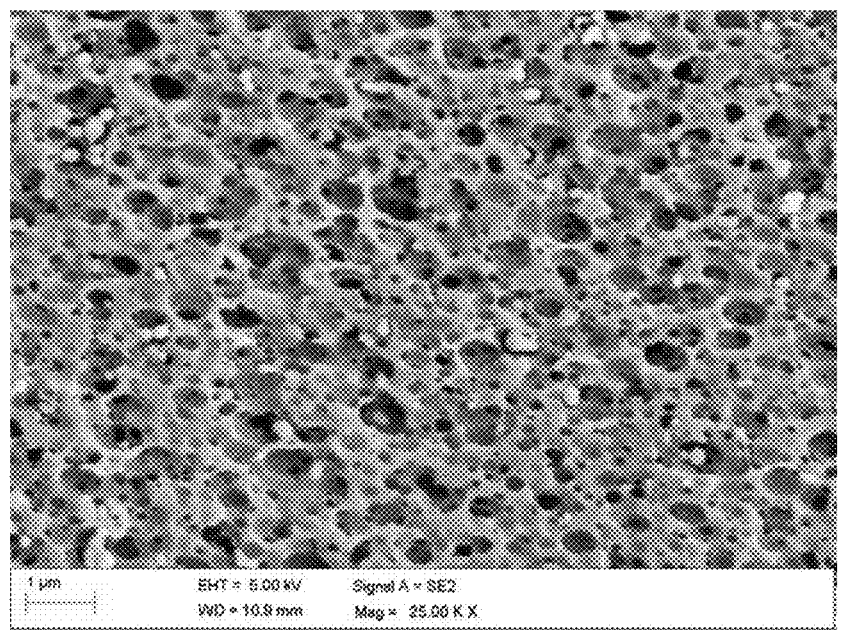
FIG. 4 is a SEM image at 25,000× magnification of an ABS surface etched with an ozone regenerated Mn(III) aqueous acid solution.

An ABS test plaque was cleaned using a conventional and commercially available Cleaner PM-900 (available from Rohm and Haas Electronic Materials LLC) for 3 min at 45° C. Subsequently, the ABS plastic part was immersed for 10 min into the aqueous acid etching solution at 65° C. and then rinsed with deionized water at room temperature. After drying the sample was subjected to SEM investigation at 25,000× which is shown in FIG. 4. As shown in FIG. 4, the aqueous acid etch solution containing the Mn(III) significantly roughened the ABS surface as evidenced by the numerous pores.

Another ABS test plaque was cleaned using Cleaner PM-900 for 3 min at 45° C. The cleaner treatment removed soils and fingerprints from the surface, but left the surface unmodified or unchanged and hydrophobic. Subsequently, the ABS plaque was immersed for 7 min into the above-mentioned etching solution at 60° C. and then rinsed with deionized water at room temperature. The surface of the ABS appeared substantially as shown in FIG. 4.

The ABS was then treated with an activator solution of CATAPOSIT™ PM-957 colloidal palladium-tin catalyst at 30° C. for 3 min (available from Rohm and Haas Electronic Materials LLC). The catalyzed ABS was then treated with ACCELERATOR™ PM-964 solution (available from Rohm and Haas Electronic Materials LLC) for 3 min at 45° C. and then plated with electroless nickel using NIPOSIT™ PM-988 electroless nickel plating solution (available from Rohm and Haas Electronic Materials LLC). Electroless nickel plating was done at 33° C. to deposit a nickel layer of 0.3 μm. Subsequently, the nickel-plated ABS was electroplated with an alkaline copper strike using copper-pyrophosphate based electroplating bath for 6 min at 1 A/dm$^2$ at 42° C. to ensure sufficient conductivity for subsequent step. Then, the part was subjected to acid copper plating using ECOPOSIT™ 950 copper electroplating bath (available from Rohm and Haas Electronic Materials LLC). Acid copper plating was done at room temperature until a 40 μm copper layer was deposited at 3 A/dm$^2$. The nickel and copper plated ABS was then heated for 1 hour at 70° C.

A Mecmesin Versa Test with advanced force gauge Mecmesin AFG-100N, analogous to ASTM B533-85, was used to measure the peel strength. The peel strength of the metal deposits was measured at 1 cm peel strip at 25 mm/min peel speed. The peel strength was determined to be 10 N/cm.

Example 6

Figure 5:
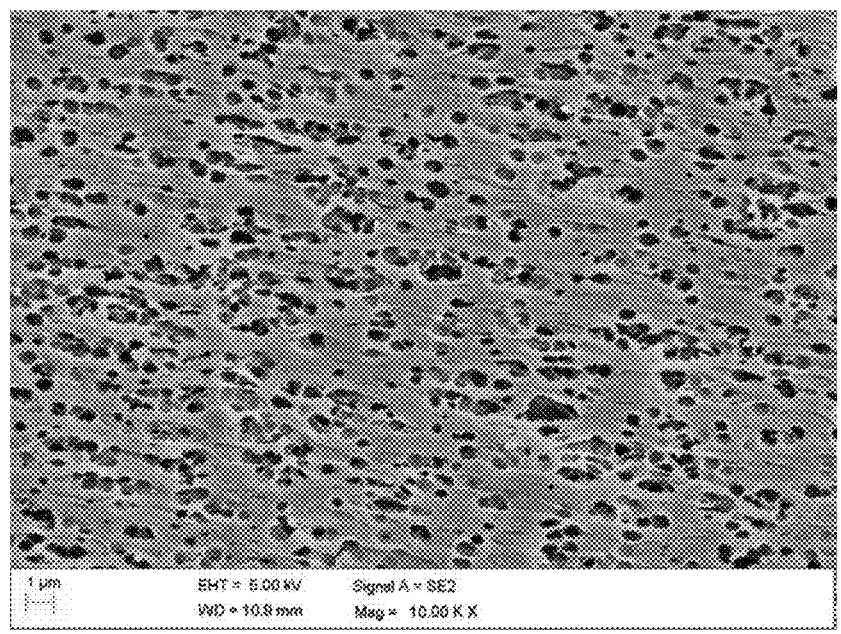
FIG. 5 is an SEM image at 10,000× magnification of a PC-ABS surface etched with an ozone regenerated Mn(III) aqueous acid solution.

A PC-ABS test plaque was cleaned using Cleaner PM-900 for 3 min at 45° C. Then, the PC-ABS plaque was immersed for 2 min into solvent swell solution Conditioner PM-920 at 30° C. After rinsing the PC-ABS plaque was immersed for 20 min into the aqueous acid etch solution of Example 2 at 65° C. and then rinsed with deionized water. After drying the PC-ABS was subjected to SEM investigation at 10,000× which is shown in FIG. 5. As shown in FIG. 5, the aqueous acid etch solution containing the Mn(III) significantly roughened the PC-ABS surface as evidenced by the numerous pores.

A second PC-ABS test plaque was cleaned using Cleaner PM-900 for 3 min at 45° C. The cleaner treatment removed soils and fingerprints from the surface, but left the surface unmodified and hydrophobic. Then, the PC-ABS plaque was immersed for 2 min into solvent swell solution Conditioner PM-920 at 30° C. After rinsing, the PC-ABS plaque was immersed for 20 min into the etching solution of Example 2 at 65° C. and then rinsed with deionized water at room temperature. The PC-ABS was then treated with an activator solution of CATAPOSIT™ PM-957 colloidal tin/palladium catalyst at 30° C. for 3 min. The catalyzed PC-ABS was then treated with ACCELERATOR™ PM-964 solution for 3 min at 45° C. and then plated with electroless nickel using NIPOSIT™ PM-988 electroless nickel plating solution. Electroless nickel plating was done at 33° C. to deposit a nickel layer of 0.3 μm. Subsequently, the nickel-plated PC-ABS was electroplated with an alkaline copper strike using copper-pyrophosphate based electroplating bath for 6 min at 1 A/dm$^2$ at 42° C. to ensure sufficient conductivity for a subsequent step. Then, the part was subjected to acid copper plating using ECOPOSIT™ 950 copper electroplating bath (available from Rohm and Haas Electronic Materials LLC). Acid copper plating was done at room temperature until a 40 μm copper layer was deposited at 3 A/dm$^2$. The nickel and copper plated PC-ABS was then heated for 1 hour at 70° C.

A Mecmesin Versa Test with advanced force gauge Mecmesin AFG-100N, analogous to ASTM B533-85, was used to measure the peel strength. The peel strength of the metal deposits was measured at 1 cm peel strip at 25 mm/min peel speed. The peel strength was determined to be 7 N/cm.

Example 7 (Comparative)

Efficiency of generating permanganate ions (Mn(VII)) from Mn(II) ions using a conventional ozone process for preparing a conventional permanganate based chrome-free etch composition is described below. The test solution containing components in amounts shown in Table 1 was prepared.

TABLE 1

| COMPONENT | AMOUNT (mol/L) |
|---|---|
| Manganese (II) sulfate | 0.07 |
| Methane sulfonic acid | 4 |
| Sulfuric acid | 8 |

Using a commercially available ozone generation device, ozone gas was blown into the test solution (1 L) for one hour, and the concentration of permanganate ion generated in the bath was obtained by ascorbic acid titration. The yield of ozone gas was 200 mg/h or 1000 mg/h, and the blowing amount was 2 L/min.

Ozone gas was blown by using either of the following methods: a method of blowing ozone gas by using a glass tube with a tip diameter of 1.5 mm (general bubbling) or a method of blowing ozone gas in microbubble form by providing the end of the glass tube with pumice having a diameter of about 30 μm (microbubbling). The results are disclosed in Table 2.

TABLE 2

| Example | Ozone Input (mg/h) | Treatment Temperature (° C.) | Bubbling Method | Permanganate Concentration (mg/L) |
|---|---|---|---|---|
| 1 | 200 | 25 | General bubbling | 1.5 |
| 2 | 200 | 25 | microbubbling | 7.5 |
| 3 | 200 | 50 | microbubbling | 12 |

TABLE 2-continued

| Example | Ozone Input (mg/h) | Treatment Temperature (° C.) | Bubbling Method | Permanganate Concentration (mg/L) |
|---|---|---|---|---|
| 4 | 200 | 70 | microbubbling | 15 |
| 5 | 1000 | 25 | General bubbling | 7.5 |
| 6 | 1000 | 25 | microbubbling | 37.5 |
| 7 | 1000 | 50 | microbubbling | 60 |
| 8 | 1000 | 70 | microbubbling | 75 |

The efficiency of the permanganate generation by the ozone was determined using the following equation:

Efficiency=(amount of permanganate produced×5 (electrons transferred))/(amount of ozone passed through the solution×2 (electrons transferred)× 100%.

The efficiency data is disclosed in Table 3 below.

TABLE 3

| Example | Permanganate Ion Concentration (mmol/L) | Amount of Permanganate Produced (mmol) | Amount of ozone Passed Through Solution (mmol) | Efficiency |
|---|---|---|---|---|
| 1 | 0.013 | 0.013 | 4.167 | 0.76% |
| 2 | 0.063 | 0.063 | 4.167 | 3.78% |
| 3 | 0.101 | 0.101 | 4.167 | 6.05% |
| 4 | 0.126 | 0.126 | 4.167 | 7.57% |
| 5 | 0.063 | 0.063 | 20.833 | 0.76% |
| 6 | 0.315 | 0.315 | 20.833 | 3.78% |
| 7 | 0.504 | 0.504 | 20.833 | 6.05% |
| 8 | 0.631 | 0.631 | 20.833 | 7.57% |

The ozone process of the foregoing conventional method only had an efficiency of a high of 7.57%. In contrast, the method of the present invention as disclosed in Example 2 above had an efficiency of 78.3%.

What is claimed is:

1. A method comprising:
   a) providing a substrate comprising one or more organic polymers;
   b) providing an aqueous acid solution comprising sulfuric acid, one or more alkane sulfonic acids and Mn(II) ions and counter anions;
   c) injecting ozone gas in the aqueous acid solution to oxidize the Mn(II) ions with ozone to generate at least 15 mmol/L Mn(III) ions, wherein efficiency of oxidizing Mn(II) ions with the ozone to generate the at least 15 mmol/L Mn(III) ions is at least 60%, and wherein the ozone gas is injected in the aqueous acid solution at a rate of 0.1 g/L/hour to 10 g/L/hour; and
   d) contacting the substrate comprising the one or more organic polymers with an aqueous acid solution containing the at least 15 mmol/L Mn(III) ions to etch the one or more polymers of the substrate.

2. The method of claim 1, wherein the efficiency is at least 70%.

3. The method of claim 2, wherein the efficiency is 80% to 95%.

4. The method of claim 1, wherein the aqueous ozone gas is injected in the aqueous acid solution at a rate of 0.2 g/L/hour to 7 g/L/hour.

5. The method of claim 1, wherein a concentration of the Mn(III) ions is from 15-70 mmol/L.

6. The method of claim 5, wherein the concentration of the Mn(III) ions is from 30-60 mmol/L.

7. The method of claim 6, wherein the concentration of the Mn(III) ions is from 35-55 mmol/L.

8. The method of claim 1, wherein the aqueous acid solution further comprises one or more sources of metal ions.

* * * * *